Aug. 9, 1949.    J. BUECHEK    2,478,685
DOUGH SHEETER
Original Filed Oct. 13, 1941
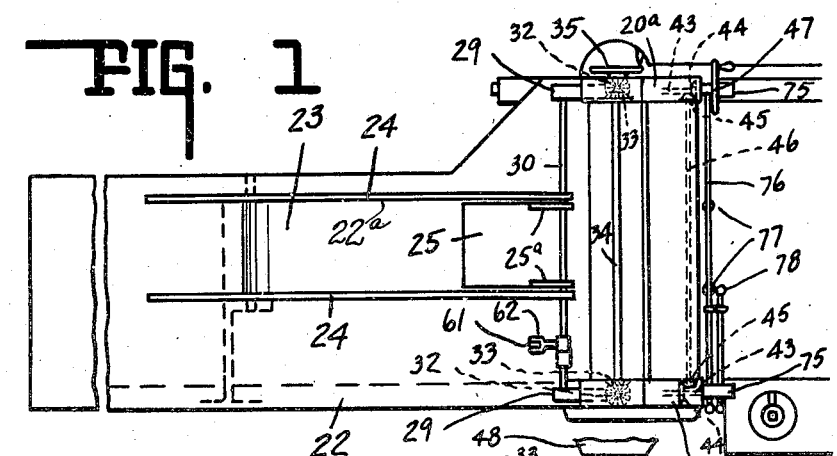
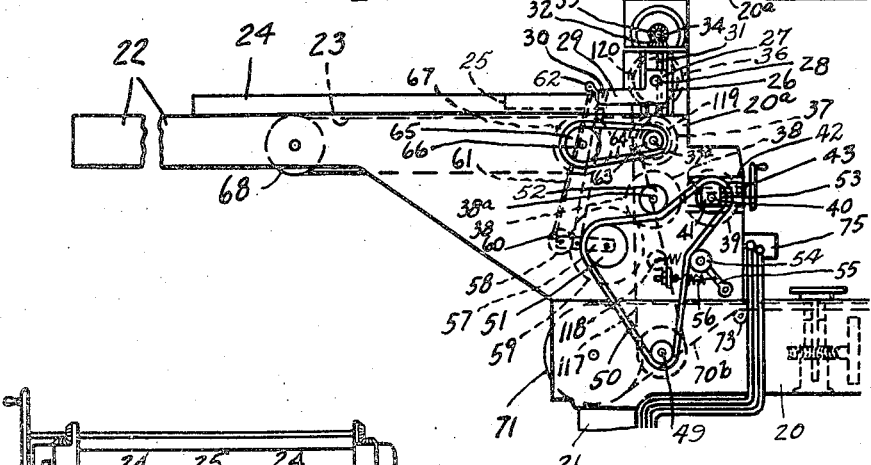
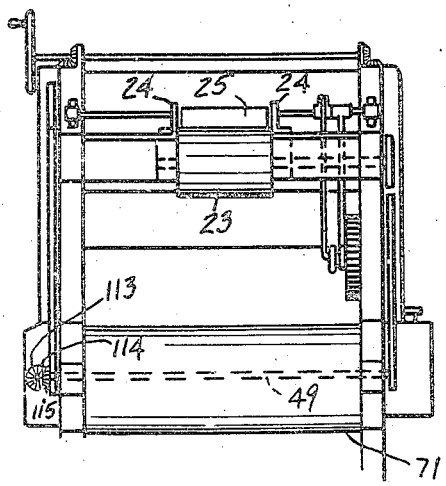
INVENTOR.
JOHN BUECHEK.
BY
Lockwood, Goldsmith & Galt
ATTORNEYS.

Patented Aug. 9, 1949

2,478,685

UNITED STATES PATENT OFFICE 2,478,685

DOUGH SHEETER

John Buechek, Kokomo, Ind., assignor, by mesne assignments, of one-half to American Bakers Machinery Company, St. Louis, Mo., a corporation Original application October 13, 1941, Serial No. 414,760, now Patent No. 2,337,539, December 28, 1943. Divided and this application September 16, 1943, Serial No. 502,554

1 Claim. (Cl. 107—30)

This invention relates to a mechanical sheeter for sheeting bakery dough to predetermined thickness and width so that a sheet of this character may be continuously supplied to other dough operating apparatus for ware (or article) fabrication.

The chief object of the present invention is to form a dough sheet of the aforesaid character and more particularly a sheet wherein same is of substantially uniform density and thickness and wherein all air pockets are eliminated so that voids or holes will not occur in the baked product as a result of such pockets.

The chief feature of the present invention resides in the reciprocatory pressure applicator in conjunction with an endless conveyor, and at least one pair of pressure rolls.

Other objects and features of the invention will be set forth more fully hereinafter.

This application is a true division of copending application Serial No. 414,760 filed October 13, 1941 and entitled Baking dough rolling machine, allowed April 5, 1943 and now Patent No. 2,337,539, dated December 28, 1943.

The full nature of the invention will be understood from the accompanying drawings and the following description and claim:

In the drawings Fig. 1 is a top plan view of a baking dough handling machine and more particularly of the sheet forming end thereof.

Fig. 2 is a side elevation thereof.

Fig. 3 is a front elevation thereof.

In the drawings, the numeral 20 indicates two side frames suitably connected together and supported by legs 21. There is supported by this frame work a table or platform 22 and running in opening 22a therein is an endless belt conveyor 23 carried by drums 67 and 68. This conveyor runs between two guides 24, the strip of dough being confined by these guides and being moved by this belt conveyor.

The baker applies the dough at the receiving or left-hand end of the platform 22 in alignment with the belt conveyor, having previously applied sufficient dusting flour, or the like, to the platform ahead of the belt, so that the sheet of dough is suitably dusted on its lower face.

The baker pushes this hand formed sheet of dough into the throat formed by the guides 24 projecting toward the left beyond the endless belt conveyor 23, and the surplus dough on the remote sides of these guides is removed and subsequently reworked into another sheet. The baker, in feeding this dough, tries to form a fairly flat sheet of approximately proper thickness and width.

Before this dough is exhausted, the baker prepares another piece so that at the proper time he can crimp the latter to the former before it passes completely through the sheeter.

The endless belt conveyor 23 then carries the dough forward and to the right in Figs. 1 and 2, whereupon, while on the conveyor, the sheet of dough encounters a flattening element 25. This flattening element 25 has about 1½" throw to and fro towards and away from the conveyor 23 and at each reciprocation it mashes or flattens out the dough between the two guides and on the conveyor.

Mounted in each of the upright portions 20a of the frame structure 20 is a guideway 26 which mounts a crosshead 27 providing a bearing for one end of the shaft 28. This crosshead has a rearwardly directed arm 29 which pivotally supports as at 30 the beater 25, the latter having forwardly extending arms 25a.

Each crosshead 27 is provided with a screw-threaded attachment member 31 and these two members mount at their upper ends bevel gears 32 that mesh with similar bevel gears 33 carried by the shaft 34. This shaft 34 mounts a handwheel 35 on one end or the shaft may be extended and may be provided with a handwheel at both ends. By means of this adjustment the height of the beater 25 and the height of the pressure roller 36, which is the upper roller engaging the upper surface of the sheet of dough, may be adjusted.

Immediately beneath roller 36 is another roller 37 which has a fixed position and said roller 37 has its upper, longitudinal element substantially coplanar with that of the platform or table 22 and the upper run of the belt conveyor 23.

Immediately below the roller 37 is another roller 38 and forwardly thereof is a roller 39 mounted on shaft 40 carried by crossheads 41 slidably supported in the ways or guides 42. A screw element 43 is arranged to advance and return the roller 39. Each of these screws is provided with a bevel gear 44 and these bevel gears mesh with similar gears 45 carried by a shaft 46. A handwheel 47 is arranged to simultaneously move the crossheads 41 forwardly or rearwardly and thus move the roller 39 forwardly or rearwardly away from or toward the roller 38. The dough advanced by the conveyor 23 passes beneath the beater 25 and thence between the rollers 36 and 37 and then drops vertically between the two rollers 38 and 39.

There may be supported above roller 36 a suitable dusting arrangement, the lower hopper throat portion being illustrated only in Fig. 2 and indicated by numeral 48. This supplies dusting flour to the top surface or face of the dough sheet so that the sheet will not adhere to the upper roller 36, it being remembered that the baker has sufficiently dusted or floured the lower face of the sheet ahead of the conveyor 23. This dusting of both sides of the sheet of dough also prevents adherence of the sheet to the subsequent rollers 38 and 39. One function of the beater before mentioned is to prevent the dough from stratifying and tearing as it is borne through the two upper rollers 36 and 37.

As the sheet of dough prepared by the baker is exhausted, the baker prepares another sheet and places it immediately adjacent the rear end of the advancing sheet, which he has previously prepared, and then crimps the ends together to unite the sheets to insure continuous sheet formation for continuous production by subsequent apparatus.

In Fig. 2 the numeral 49 indicates a main power drive. A chain drive 50 passes over a sprocket pulley 51 and then passes under a sprocket pulley 52, the latter being carried by the shaft 38a, of the roller 38. It also passes over a sprocket pulley 53 carried by the shaft 40 of the roller 39. This driving chain passes over a tensioning sprocket pulley 54, mounted on a pivoted arm 55 and spring constrained as at 56. This, as stated, is a tensioning arrangement. In this way it will be observed that the rollers 38 and 39 are positively driven and in opposite directions by said chain belt 50.

Coaxial with the center of the sprocket pulley 51 is an arm 57 and mounted on the end thereof is a gear 58. This gear 58 meshes with a gear 59 also coaxial with the sprocket pulley 51 and rotatable therewith. Thus the pinion 58 rotates at a relatively high speed. The pinion 58 has an eccentric pin 60 and a rod 61 is pivotally mounted thereon so that, in the rotation of the gear 58, the rod 61 is reciprocated generally in the up and down direction.

The upper end of this eccentric rod 61 is connected to a lever arm 62 which is rigid with the shaft 30 which supports the beater 25 by means of the extensions or arms 25a. It will be remembered the shaft 30 is mounted in arms 29 constituting extensions of the crosshead 27. When the crossheads are elevated, arms 29 are elevated therewith and in a like amount, and accordingly, by means of the rod construction 61, the arm 57 rotates clockwise to permit such elevating movement without interference, yet at the same time retaining the pinion 58 in mesh with the gear 59 for power application to the beater.

The superposed upper rollers 36 and 37 are suitably driven from the main power source. The shaft 37a of the lower roller mounts a sprocket pulley 63 which is driven by a chain drive 64, in turn driving a sprocket pulley 65 carried by the shaft 66 of the pulley or drum 67, which supports the forward end of the conveyor 23. The rearward end of this conveyor is supported by the drum 68. The ratio of the drives is such that the peripheral speed of the superposed drums or rollers 36 and 37 is approximately twice that of the peripheral speed of the conveyor 23. This power application, if desired, may be provided with a tensioning device such as illustrated in Fig. 2 and indicated by the numerals 54 to 56, inclusive. For clearness, this tensioning device is intentionally omitted from the present disclosure. It might be here stated the power connection from shaft 49 to the shaft 37, etc., is positioned upon the opposite side of the machine from the side illustrated in Fig. 2. The rollers 36 and 37 have substantially the same peripheral speed as the rollers 38 and 39.

Positioned beneath the aforesaid mechanism is an endless conveyor 70, the rearward end thereof only being shown, and passing over drum 71, see Fig. 2. The lower run of this conveyor is directed upwardly as indicated at 70b by means of idler 73. Suitable tensioning means may be provided such as illustrated at 54, 55 and 56, whenever desired or required. For clearness, same is omitted herefrom.

The power for driving the conveyor 70 is applied to the other end thereof (not illustrated herein) as shown in said patent. The peripheral speed of this conveyor is substantially the same as the peripheral speed of the cooperating pairs of rollers 36, 37 and 38 and 39 and thus take away belt 70 has a speed approximately twice that of belt 23.

As stated shaft 49 is the power shaft for the beater and cooperating rolls 36, 37 and 38, 39 and the belt 23 and is operable such that belt 70 has the relative speed specified, belt 70 deriving power from the same power source (not shown but see the patent made a part hereof) which power source drives shaft 49.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

Dough sheeting mechanism including in combination a supporting table, an endless conveyor belt having its upper run disposed thereon, a pair of elongated parallel disposed guide members extending upwardly from the said belt upper run and the table and parallel to belt travel direction, an elongated beater blade extending from adjacent the discharge end of the belt upstream therealong and of a width less than the member spacing and of an effective length greater than the width of the beater blade, power means advancing the belt, means pivotally mounting the beater blade at its downstream end adjacent the discharge end of the belt, and means operable in timed relation by said power means for oscillating the beater in timed relation to belt advance, the relative timing being such that the dough at any one point on the conveyor is subjected to multiple beating action by the blade before discharging from said conveyor.

JOHN BUECHEK.

REFERENCES CITED

The following references are of record in the file of this patent:

UNITED STATES PATENTS

| Number | Name | Date |
|---|---|---|
| 78,778 | Wilmans et al. | June 9, 1868 |
| 376,068 | Chase | Jan. 10, 1888 |
| 777,349 | Mitchell | Dec. 13, 1904 |
| 881,439 | Peters | Mar. 10, 1908 |
| 923,360 | Kruse | June 1, 1909 |
| 1,225,481 | Nuubson et al. | May 8, 1917 |
| 1,577,934 | Pearce | Mar. 23, 1926 |
| 1,945,755 | Scruggs | Feb. 6, 1934 |

FOREIGN PATENTS

| Number | Country | Date |
|---|---|---|
| 6,339 | Netherlands | Aug. 10, 1921 |